Dec. 28, 1965  L. E. CANCEL  3,225,804
METHOD OF SHELLING COCONUTS
Filed Oct. 29, 1963
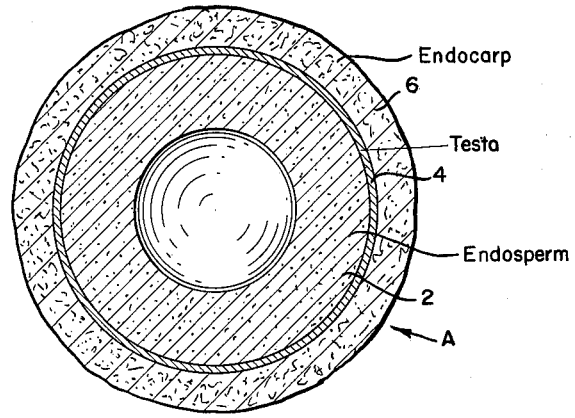
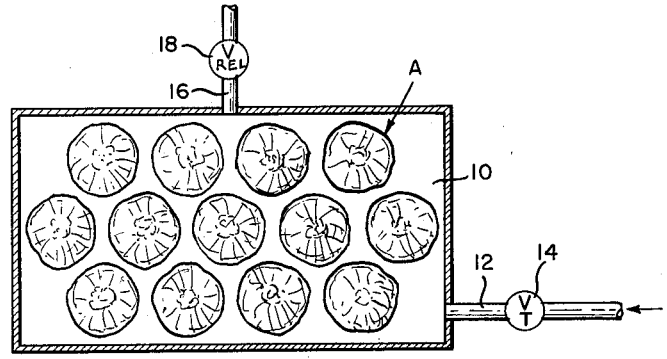
INVENTOR
LUIS E. CANCEL
BY  *Scrivener + Parker*
ATTORNEYS

United States Patent Office 3,225,804
Patented Dec. 28, 1965

3,225,804
METHOD OF SHELLING COCONUTS
Luis E. Cancel, Rio Piedras, Puerto Rico, assignor to the Commonwealth of Puerto Rico
Filed Oct. 29, 1963, Ser. No. 319,754
2 Claims. (Cl. 146—223)

This invention has to do broadly with the treatment of coconuts (*Cocos nucifera*) to produce coconut meat for use and marketing and, more particularly, relates to methods and processes for separating from the generally spherical body of useful and marketable white coconut meat the useless thin brownish skin which adheres thereto in the natural state of the coconut.

In its natural, untreated state the generally spherical body of white pulp (*endosperm*) 2 of a coconut is covered with a thin brown skin (*testa*) 4 which is firmly and almost inseparably united with the white meat, and these parts are encased in a hard outer shell (*endocarp*) 6. In usual commercial practice the pulp is obtained from the fresh nut by first removing the hard outer shell by hand or machine, with or without the aid of steam, thus producing the pulp meat covered with the thin brown skin. This skin must be removed in order to produce the white marketable meat, and this is now usually done commercially by machine or by hand paring, resulting in pulp loss of as much as 15% of the weight of the usable pulp because of the impossibility of removing the skin without also paring away part of the pulp. In addition, removal of the skin by paring and other known commercial methods is time consuming. It will be apparent, therefore, that it is of economic importance in the production of coconut meat for market to provide a method of removing both the hard outer shell and the skin adhering to the meat, which will be faster and less expensive than known methods and which will also eliminate the loss of meat which accompanies all paring methods. It has been the principal object of this invention to provide such a method.

The invention is described in the following specification and is illustrated in the accompanying drawing, in which:

FIG. 1 is a cross sectional view through a coconut showing all of the parts thereof before removal of any of them and before treatment in accordance with the invention, and FIG. 2 illustrates the treatment of the coconuts in accordance with the invention.

In accordance with the invention whole coconuts A, including the hard outer shell, the pulp and the skin covering the pulp, are placed in a retort 10 having a steam inlet pipe 12 including a valve 14, and also having a pressure relief port 16 controlled by a valve 18 which permits instantaneous relief of the pressure within the retort. When the retort has been charged with coconuts the relief valve is closed and steam at 148° C to 163° C. is admitted under pressure of 50 to 70 p.s.i. for 6 to 10 minutes. At the end of this time the steam inlet is closed and the relief valve 18 is opened, instantaneously relieving to atmosphere the pressure in the retort. The coconuts are then removed from the retort and the outer shell is broken, by machine or hand, while still hot. Substantially all of the brown skin, which normally adheres to the kernel, now adheres to the outer shell and is removed with it, leaving the greater part of the white coconut meat free of the skin and therefore immediately suitable for use or marketing. The efficacy of the process in removing skin is shown by the following results of its actual use:

| Number of Coconuts Shelled | Weight of Coconuts, lbs. | On Shelling | |
|---|---|---|---|
| | | Percent by Weight of pulp without brown skin | Percent by Weight of pulp with brown skin |
| 98 | 177.5 | 91 | 9 |
| 99 | 166.5 | 87.5 | 12.5 |
| 95 | 213 | 90.6 | 9.4 |
| 10 | 15.75 | 93.4 | 6.6 |
| 10 | 10.75 | 80.0 | 20.0 |
| 10 | 15.75 | 80.6 | 19.4 |
| 10 | 16.75 | 86.2 | 13.8 |
| 10 | 17.0 | 90.2 | 9.8 |
| 10 | 15.0 | 96.0 | 4.0 |
| 13 | 23.0 | 90.5 | 9.5 |
| 9 | 15.5 | 92.5 | 7.5 |
| 21 | 37.5 | 80.0 | 20.0 |
| 16 | 25.0 | 87.5 | 12.5 |
| 13 | 26 | 93.0 | |
| 5 | 11.5 | 88.0 | |
| 11 | 23.0 | 86.0 | |

It will be seen that by the present invention I have provided a process by which in as little as six minutes and without the use of special knives and machinery substantially all of the adhering brown skin may be removed from the useful coconut meat, thus greatly improving the economics of the marketing of coconuts.

While I have described and illustrated certain steps of the method provided by my invention it will be apparent to those skilled in the art to which it relates that other or equivalent steps as well as modifications of those disclosed may be used without departing in any way from the spirit or scope of the invention, for the limits of which reference must be made to the appended claims.

What is claimed is:

1. The method of removing the brownish skin which adheres to the exterior of the marketable white pulp meat of a coconut, comprising the steps of subjecting the whole coconut, including the hard outer shell, to steam at 148° C. to 163° C. and at a pressure of 50 to 70 p.s.i. for a period of 6 to 10 minutes, then instantaneously reducing the pressure to atmosphere, and while still hot breaking the hard outer shell from the kernel taking the brownish skin with it and leaving the white pulp meat uncovered.

2. The method of removing the brownish skin which adheres to the exterior of the generally spherical body of marketable white meat of a coconut, which consists in placing the whole coconut including the hard outer shell in a closed retort, introducing steam at 148° C. to 163° C. and at a pressure of 50 to 70 p.s.i. into the retort for 6 to 10 minutes, then instantaneously reducing the pressure in the retort to atmosphere, removing the coconuts from the retort, and while still hot breaking off the hard outer shell from the kernel taking the brownish skin with it and leaving the white pulp meat uncovered.

References Cited by the Examiner
UNITED STATES PATENTS
1,413,386  4/1922  Rohr et al. _____ 146—7
2,431,602  11/1947  Zeun _____ 146—227

LESTER M. SWINGLE, *Primary Examiner.*
J. SPENCER OVERHOLSER, *Examiner.*